United States Patent [19]

Katagi et al.

[11] 3,821,728

[45] June 28, 1974

[54] GLICH FREE VECTOR GENERATION

[75] Inventors: Kazuo Katagi, Woodland Hills; Walter Lee Ross, Simi Valley; John Jeffrey Lyon, Northridge, all of Calif.

[73] Assignee: RCA Corporation, New York, N.Y.

[22] Filed: Aug. 14, 1972

[21] Appl. No.: 280,096

[52] U.S. Cl. .............................. 340/324 A, 315/18
[51] Int. Cl. ............................................ G06f 3/14
[58] Field of Search........ 340/324 A, 347 D, 347 A, 340/347; 235/150.53, 197, 198, 168; 315/18, 22, 19; 328/14, 44, 41, 51

[56] References Cited

UNITED STATES PATENTS 3,510,865 5/1970 Callahan ........................ 340/324 A
3,566,097 2/1971 Hildebrandt ........................ 235/168
3,582,943 6/1971 Weller ........................ 340/347 D A
3,587,083 6/1971 Tubinis ........................ 340/324 A
3,665,460 5/1972 Murakami.................. 340/347 D A

*Primary Examiner*—John W. Caldwell
*Assistant Examiner*—Marshall M. Curtis
*Attorney, Agent, or Firm*—Edward J. Norton; Carl M. Wright

[57] ABSTRACT

Two groups of serially occuring pulses, indicative of the lengths of the two components of a vector, are employed to shift binary ones into or remove them from two forward-backward shift registers. Each stored binary one is translated to an increment of current of unit magnitude. The deflection voltages for producing a vector are obtained by summing the unit current increments derived from each register.

3 Claims, 6 Drawing Figures

GLICH FREE VECTOR GENERATION

BACKGROUND OF THE INVENTION

FIG. 1 represents, in a simplified way, a conventional vector generator. The *x* and *y* vector command generator 10, which may be a digital computer, produces a number of *x* pulses on lead 12 and a number of *y* pulses on lead 14 indicative of the length of vector to be generated. These pulses are applied to the *x* and *y* binary counters 16 and 18, respectively. The generator 10 also applies to the counters via leads 20 and 22 direct voltages indicative of the counting direction. The counting direction, of course, corresponds to the desired vector direction. In the case illustrated, it arbitrarily may be assumed that the forward command applied to the *x* counter corresponds to movement in the $+x$ direction and a backward command applied to the same counter corresponds to movement in the $-x$ direction. A similar convention applies to the command on lead 22 applied to the *y* counter 18.

The count stored in the *x* counter may be applied directly or, if desired, through an intermediate storage register (not shown) to digital to analog (D/A) converter 24. The analog quantity produced by converter 24 is translated by the deflection wave generator 26 to a deflection wave and applied to the *x* deflection means of the cathode ray tube 28. For purposes of the present example, the deflection means is shown as a pair of electrostatic deflection plates 30*a*, 30*b;* however, it is to be understood that magnetic deflection coils may be employed instead.

The D to A converter 32 and deflection wave generator 34 correspond to the converter 24 and generator 26, respectively. Similarly, the y deflection plates 36*a* and 36*b* are analagous to the *x* deflection plates already discussed.

Some idealized waveforms produced by the D to A converter 24 are shown at a in FIG. 2. In response to each digital quantity stored in the counter, the D to A converter 24 produces a corresponding analog voltage. The deflection wave generator 26 ideally translates each analog signal to a linear deflection wave in the manner shown in FIG. 2*a*. The result of applying this wave b and a corresponding *y* deflection wave (not shown) produced by generator 34 to the *x* and *y* deflection means 30 and 36, respectively, of the cathode ray tube 28 is to trace vectors on the screen of the cathode ray tube, as illustrated.

In practice, the idealized conditions discussed above do not exist. Digital to analog converters which are commercially available, and which are used where very high deflection speeds are desirable, are extremely fast. They operate in the tens of nanoseconds range. The counters, on the other hand, do not operate quite as rapidly and, when going from one count to another, they may momentarily assume unstable states. For example, as shown in FIG. 2*c*, when going from a count of 7 to a count of 16, it may be that the $2^4$ counter stage (which stores the most significant digit shown—one with weight 16) will change from its zero state to its one state before the three last significant stages change their state. In this event, the count stored in the counter initially may go from 7 (00111) to 23 (10111) before it reaches the final count of 16 (10000). As the D to A converter 24 is extremely fast, it could translate the transient count of 23 to a relatively high amplitude direct voltage level. This very short and erroneous voltage level is known colloquially as a "glich" and is shown in the waveform d in FIG. 2. This temporary condition of the D to A converter 24 is translated to a distorted deflection wave and results in a distorted vector being drawn on the screen. The vector may, for example, be curved rather than straight and/or may overshoot the end point.

SUMMARY OF THE INVENTION

The solution of the present invention to the problem discussed above is to employ a forward-backward shift register rather than a counter. Each pulse produced by the vector command generator is translated to the insertion of or removal of a single 1 from the register. Moreover, rather than employing a digital to analog converter of the tranditional kind discussed above, each 1 stored in the register is instead translated to a single current increment of given amplitude (of unit weight) and these currents are summed to produce an analog quantity which is subsequently translated to a deflection wave.

DETAILED DESCRIPTION

Figure 1:
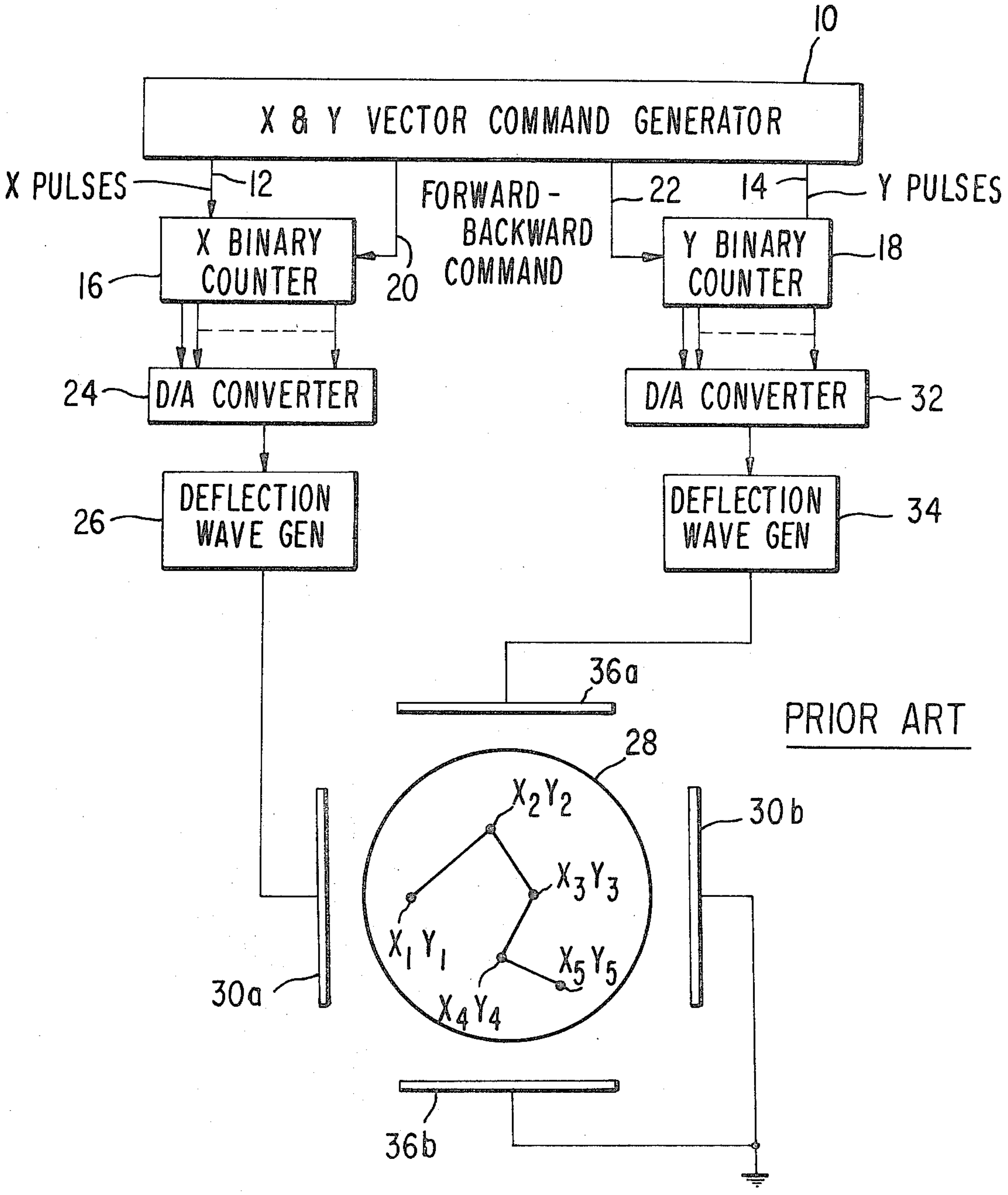
FIG. 1 is a block diagram of a prior art vector generator already discussed above.
Figure 2:
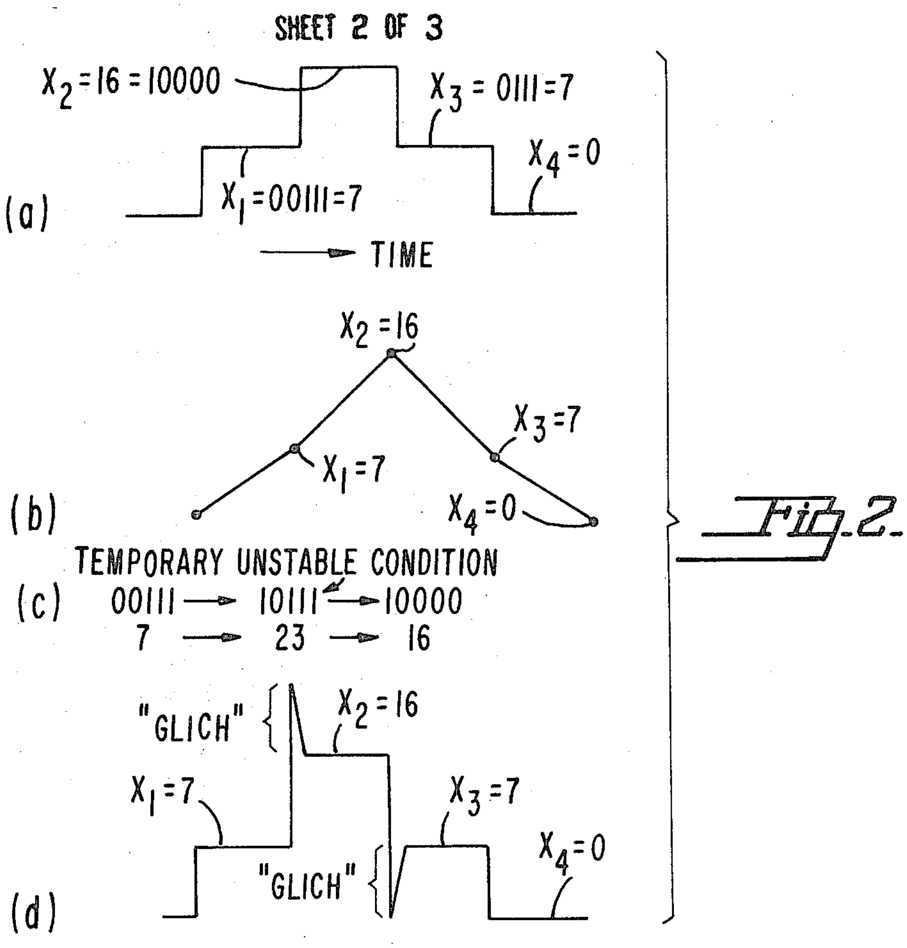
FIG. 2 is a drawing of waveforms to help explain the operation of the system of FIG. 1 and the problems encountered in this operation.
Figure 3:
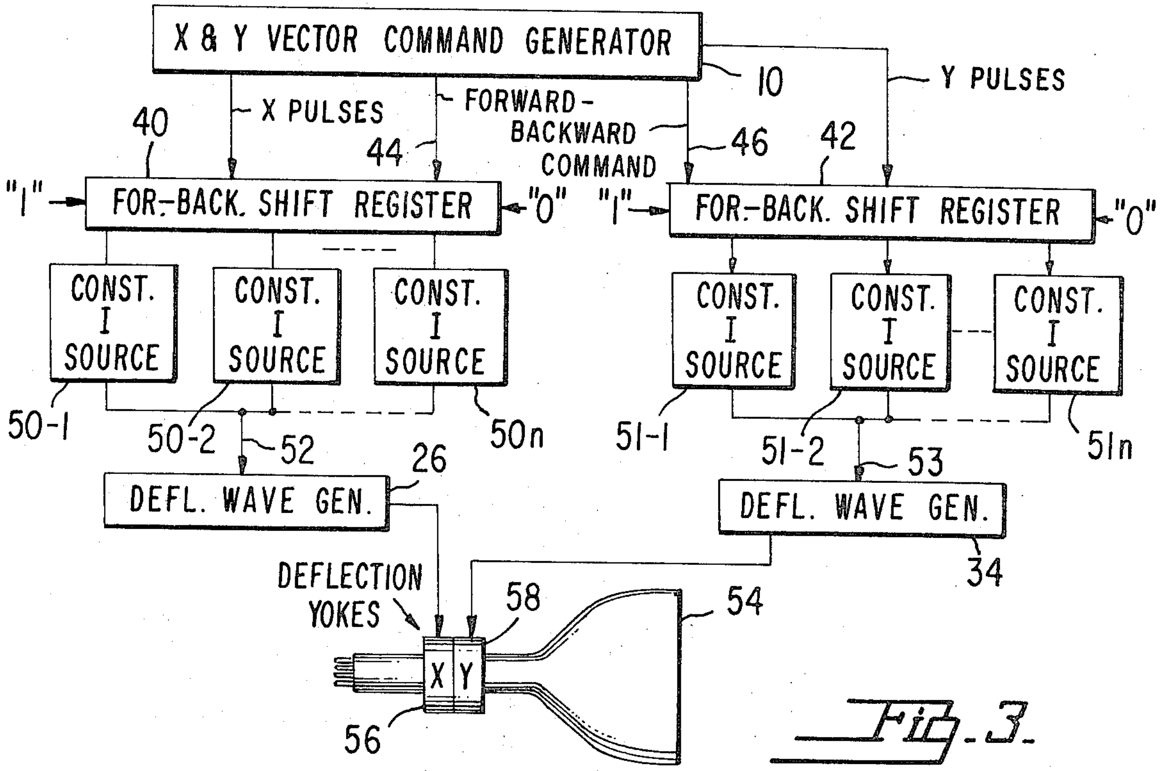
FIG. 3 is a block diagram of a vector generator according to one embodiment of the invention.

The system of FIG. 3 includes the *x* and *y* vector command generator 10 which may be the same as the corresponding generator of FIG. 1. The *x* pulses produced by the generator are applied to a forward-backward shift register 40 and the *y* pulses are applied to a forward-backward shift register 42. The generator 10 also applies, via lead 44, a forward-backward command to register 40 and, via lead 46, a forward-backward command to register 42. The 1 output terminal of each register 40 stage connects to a respective constant current source. For example, if there are n stages in register 40, there are *n* constant current sources 50-1, 50-2...50-*n*. Each current source, when it receives a signal indicative of a 1 stored in the associated register stage, produces at its output a unit increment of current and when it receives a signal indicative of a 0 stored in its associated register stage, produces zero current output. The current outputs produced by the sources are summed at the common connection 52 and applied to the deflection wave generator 26. The latter corresponds to the deflection wave generator 26.

The constant current sources 51-1, 51-2...51-*n* connect to the shift register 42. They correspond in structure and function to the sources 50. The sum of the output currents produced by the sources 51 is applied to deflection wave generator 34.

As in this example currents rather than voltages are involved, the cathode ray tube 54 is shown to have *x* and *y* deflection yokes 56 and 58 rather than deflection plates. Of course this is an example only, as the present technique is equally applicable to electrostatic deflection.

In the operation of the system of FIG. 3, assume that the registers 40 and 42 initially are storing all zeros. If it is desired, for example, to produce an *x* vector component of 7 units of length and extending in the +*x* direction, then 7 *x* pulses are applied to the register 40 and the register receives a shift forward command on lead 44. The register 40 has connected to its input stage a lead carrying a singal indicative of a 1. Input stage in the present discussion refers to the left-most stage of the register. The *x* pulses act as shift pulses. Therefore, in the forward shift state, each time an *x* pulse is applied to register 40, a 1 shifts into the left end of the register. Thus, the number stored in the register advances from 1000000...0, to 11000000...0, to 111000000...0 and so on until finally the register stores 7 ones, i.e., the number stored is 11111110...0.

Figure 4:
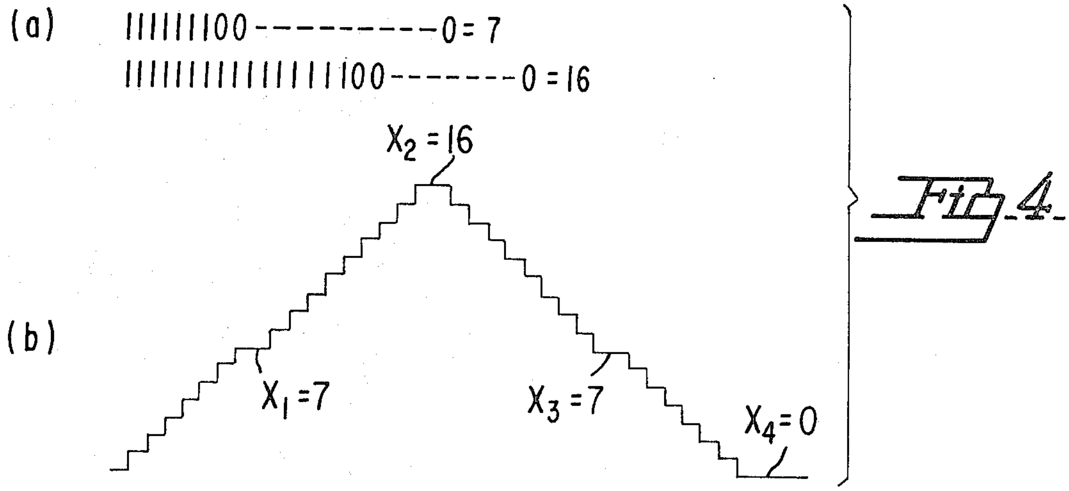
FIG. 4 is a drawing to help illustrate the operation of the system of FIG. 3.

In response to each additional 1 stored in the register, the constant current sources 50 produce an additional increment of current. The current wave present at the common output lead 52 will therefore be a stair-step wave, each step one current increment in magnitude. FIG. 4 shows at *b* such a stepped wave for the *x* components of four vectors. The first two vector components are produced by applying first seven and then nine *x* pulses to register 40 while the register is receiving a forward command. The third and fourth vector components are produced by applying first nine and then seven *x* pulses to register 40 while the register is receiving a backward command. It is understood, of course, that during the time the stepped wave at *b* in FIG. 4 is being produced, a stepped wave indicative of four y vector components concurrently is being produced at lead 53. Synchronism between the production of the *x* and *y* pulses may be achieved by means, within generator 10, of conventional design.

The deflection wave generators 26 and 34 can be simple, relatively broad band amplifiers which apply amplified versions of the stepped waves directly to the deflection coils 56 and 58. If the steps are sufficiently small, the vector which is drawn will still appear to be a relatively straight line even though, on very close observation, zigzag lines will be seen. Alternatively, the time constants associated with the yokes and deflection wave amplifiers can be such as to produce a sufficient amount of integration to provide somewhat smoothed stepped waves, such as waves with rounded corners. As a third alternative, the generators 26 and 34 can translate each unit current increment to a sawtooth wave.

It should be clear from the discussion above that no "gliches" are produces when generating a vector in the way described. Each 1 inserted in the register causes only one register stage to change state. All register stages have the same significance—each controls only one increment of current.

To obtain a vector component in the −*x* direction, the forward-backward command applied to lead 44 is changed to cause the shift register to shift in the backward direction. The rightmost stage of the register effectively receives a 0 continuously. Accordingly, in response to each *x* shift pulse, an additional 0 shifts into the right end of the register and correspondingly each time a 0 is entered into the right end of the register, a 1 is removed from (is shifted out of) the left end of the register. To illustrate, in oging from a count of 7 back to a count of 0 the contents of the register will change as follows: 11111110...0, 11111100...0, 11111000...0 and so on until the count of 0 is reached.

The stages 42, 51 and 34 operate in exactly the same way as the *x* stages already described and therefore need not be discussed separately.

In practice, the registers 40 and 42 may be, for example, large scale integrated circuit, metal-oxide semiconductor (MOS) shift registers. In a low resolution system, 128 stages may be sufficient for the *x* register 40 and 128 stages for the y register 42. However, in most applications higher resolution than this is desired. In such a case, four such registers may be used to provide 512 stages for the *x* register and four to provide 512 stages for the *y* register. If such a high capacity register is to be operated at very high speed, then each register may be operated in two halves, each half having 256 stages, by using the equivalent of multiple phase *x* and *y* shift pulses. An example of how this may be done may be found in Helbig and Ross U.S. Pat. No. 3,555,520 issued Jan. 12, 1971. In brief, the *x* register, for example, alternate *x* shift pulses are applied to one half register and the remaining *x* shift pulses to the other half register so that each half register operates at one half the *x* pulse repetition frequency. The *y* register is operated in the same way.

Figure 5:
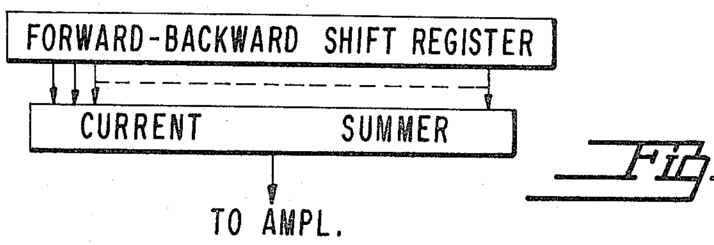
FIG. 5 is a block diagram showing a portion of the system of FIG. 3 in modified form.

The constant current sources shown in FIG. 3 may be MOS transistor gates. The transistors can be operated as constant current devices and all transistors may be connected to a common power supply. As another alternative, shown in FIG. 5, the shift register stages themselves may operate as constant current sources. In other words, when a shift register stage is storing a 0 it will produce zero output current at its 1 output terminal, and when it is storing a 1 it will produce a unit increment of current at its 1 output terminal. In this case, the constant current function is incorporated in the register itself and the circuit may be as shown in FIG. 5. The current summer may simply be a common connection; however, other alternatives are possible.

Figure 6:
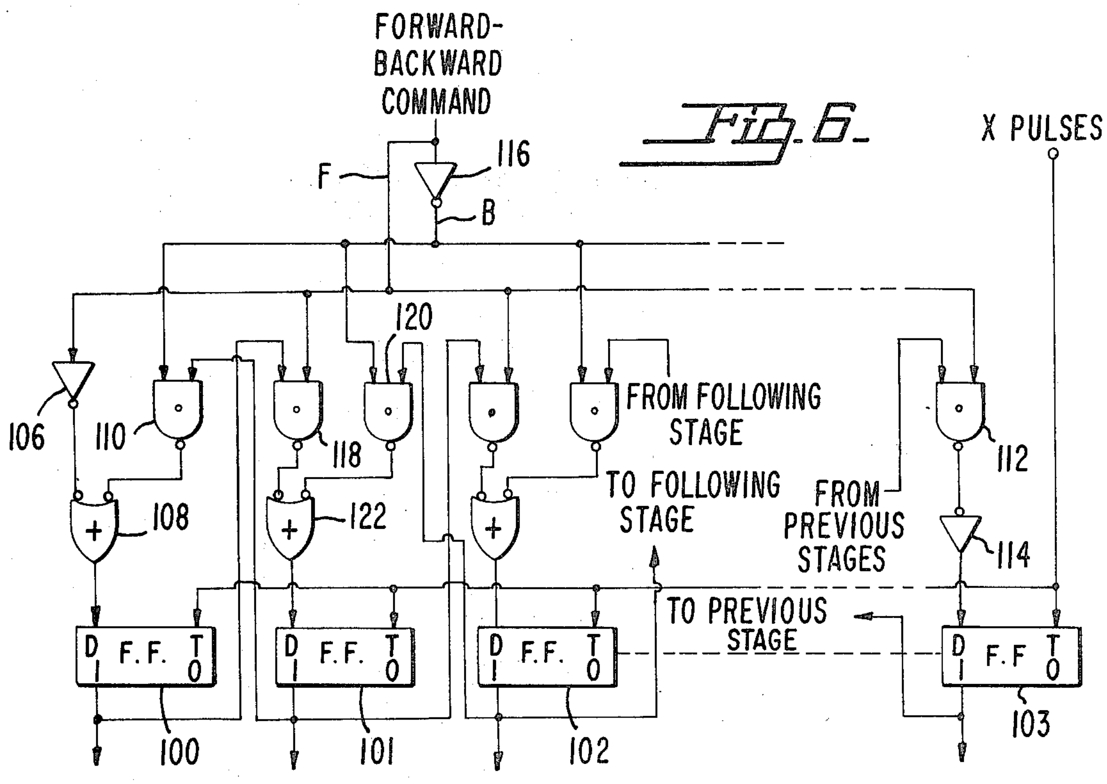
FIG. 6 is a block diagram of another form of forward-backward shift register which may be employed in the system of FIG. 3.

A forward-backward shift register suitable for the present system is illustrated in FIG. 6 as both the *x* and *y* registers are identical, only the *x* register (40 of FIG. 3) is illustrated. The register includes D type flip flops 100, 101, 102 and so on and logic stages at the input terminals of the flip-flops. The first stage includes an inverter 106 connected to one terminal of gate 108 and a gate 110 connected to the other terminal of the gate 108. The gates 110 and 108 are logically equivalent, both functioning as NAND gates. In other words, in both cases when the two inputs are high, a low is produced at the output and when one or both of the inputs is low, a high is produced at the output. The gates at the last stage of the register comprise a NAND gate 112 followed by an inverter 114. The remaining register stages each have three gates connected as shown. The *x* pulses are applied to the trigger terminal T of all stages. The forward-backward command is supplied directly to some of the gates and through inverter 116 to other of the gates.

In operation, when it is desired to shift ones into the register from the left end of the register, the forward-backward command is $F=1$. When $F=1$, inverter 106 produces a low output and gate 108 produces a high output, representing a 1, which is applied to the D terminal of flip-flop 100. Assume the register initially to be storing all zeros. In response to the first $x$ pulse, the 1 present at the D terminal of flip-flop 100 is clocked into this stage. All remaining stages continue to store zeros. For example, prior to the application of the first $x$ pulse, gate 118 receives a low representing a zero from flip-flop 100. Accordingly, gate 118 produces a high output. Gate 120 receives a signal $B = 0$ (a low) so that it also produces a high output. As both inputs to gate 122 are high, it applies a low, representing a zero, to the D terminal of flip-flop 101. Therefore, the first $x$ pulse causes a 0 to be clocked into the flip-flop 101. Since this stage already is storing a 0, there is no change in the state of the stage.

So long as F continues to remain a 1, each $x$ pulse causes another 1 to be clocked into the register. For example, in response to the second $x$ pulse, a 1 becomes stored in stages 100 and 101. In response to the third clock pulse, a 1 becomes stored in stages 100, 101 and 102 and so on.

When it is desired to cause the vector component to extend in the opposite direction, that is, when it is desired that the cathode ray beam be deflected in the $-x$ direction, F is changed to 0. Now, in response to each $x$ pulse a 1 is shifted out of the left side of the register. For example, suppose the intiial count stored is 110...0. The 0 present at the 1 output terminal of the $2^2$ stage causes gate 120 to produce a high output. The $F = 0$ signal causes the gate 118 to produce a high output. As gate 122 receives two highs, it applies a low, representing a 0, to the D terminal of flip-flop 101. In response to the first $x$ pulse, the 1 stored in stage 101 is changed to a 0 and the 1 stored in stage 100 remains a 1. Therefore, the count stored in the register has changed from 110...0 to 100...0. The next pulse causes another 1 to be shifted out of the register, leaving the count stored 000...0.

The register described above is given by way of example only. Other forms of forward-backward registers may be used instead. A small size commercially available forward-backward shift register is model No. 54194 made by manufacturers such as Texas Instruments, Signetics and others. While this register has only four stages, the principle of operation is the same for larger size registers and such larger sizes, preferably in integrated form, are suitable for use in the present system.

While not essential, it is advantageous to use large scale integrated circuit shift registers in the system of the present application. In general, within such a register the variation from stage to stage is small. Thus, if the register stages themselves are employed to produce the unit increments of current as shown in FIG. 5 for example, each increment is close in value to each other increment. In the embodiments employing separate constant current sources, it is also advantageous to use large scale integration for similar reasons.

In the various embodiments of the invention discussed, in the event of an error there is no multiplying effect, that is, each increment of current is of the same weight as any other increment. Moreover, only one unit increment of current changes value at a time. The accuracy of each unit increment of current is not critical. For example, in the case of a 512 stage register each unit increment of current represents only 1/512 of the total amount of deflection current which is possible and minor errors in one increment do not cause problems. In addition, if there are some variations in the values of unit increments of current, and these variations occur in somewhat random fashion, they will average out. Only if several unit increments of current in succession all vary in the same direction will cumulative effects become noticeable and this is not likely to occur in practice.

The various embodiments of the invention discussed above can be operated as constant velocity vector generators or as constant ime vector generators or as hybrids between the two. The techniques for operating in any of these ways are well known and, as they are not part of the present invention, they will not be discussed here. A special system for quaisi constant rate vector generation is described in copending application Ser. No. 183,168, filed Sept. 23, 1971, by J. J. Lyon and L. W. Poppen and assigned to the same assignee as the present invention. The $x$ and $y$ pulses produced in the system of this copending application may be employed to drive the shift registers 40 and 44 of the present system.

While throughout this specification the term vector generation has been employed, it is to be understood that the meaning intended is generic. For example, each vector may be part of a number or letter being drawn on the screen of display means such as a cathode ray tube or it may be part of a figure or other intelligence being displayed.

What is claimed is:

1. In a vector generator, in combination:

a forward-backward shift register;

means responsive to a signal indicative of a vector component direction for controlling the shift direction of said register;

means for producing a number of serially occurring pulses, said number proportional to the length desired of a vector component;

means responsive to said group of pulses for inserting a corresponding number of 1's in said register when the register is set to count forward and for removing a corresponding number of 1's from said register when the latter is set to count backward;

means responsive to each one stored in said register for producing a signal of unit amplitude;

a display means including a screen, means for producing an indicium on said screen, and deflection means for deflecting the indicium along one coordinate of the screen; and means for summing said signals of unit amplitude and applying them to said deflection means of said display means.

2. In combination:

means for producing a number of serially occurring first pulses, said number proportional to the length desired of an $x$ vector component;

means for producing a number of serially occurring second pulses, said number proportional to the length desired of a $y$ vector component;

means for translating each first pulse to an increment of current of unit weight;

means for summing the increments of current to provide a first deflection wave;

means for translating each second pulse to an increment of current of unit weight;

means for summing the increments of current derived from said second pulses to provide a second deflection wave;

a display device having $x$ and $y$ deflection means; and means for applying said first deflection wave to said $x$ deflection means and said second deflection wave to said $y$ deflection means.

3. In a vector generator as set forth in claim 2, each means for translating comprising a forward-backward shift register.

* * * * *